United States Patent [19]

Rude et al.

[11] Patent Number: 5,406,678
[45] Date of Patent: Apr. 18, 1995

[54] FRICTION HINGE

[75] Inventors: Edward T. Rude, Columbia, Md.; Mikhail Gelfand, Stamford, Conn.

[73] Assignee: General Clutch Corporation, Stamford, Conn.

[21] Appl. No.: 96,174

[22] Filed: Jul. 22, 1993

[51] Int. Cl.⁶ .............................................. E05D 11/08
[52] U.S. Cl. ........................................................ 16/342
[58] Field of Search ............... 16/342, 346, 348, 316, 16/322, 337, 338, 380, 385, 386, DIG. 13

[56] References Cited

U.S. PATENT DOCUMENTS

| | | | |
|---|---|---|---|
| D. 278,309 | 4/1985 | Vickers . | |
| 1,634,052 | 6/1927 | Ryan et al. | 16/338 |
| 1,898,511 | 2/1933 | Turnquist | 16/338 |
| 2,304,223 | 12/1942 | Westrope | 16/342 |
| 3,765,054 | 10/1973 | Johnson | 16/342 |
| 4,490,884 | 1/1985 | Vickers . | |
| 4,617,699 | 10/1986 | Nakamura | 16/342 |
| 4,630,333 | 12/1986 | Vickers . | |
| 4,734,955 | 4/1988 | Connor | 16/342 |
| 5,079,799 | 1/1992 | Rude et al. . | |
| 5,109,570 | 5/1992 | Okada et al. | 16/342 |
| 5,197,704 | 3/1993 | Kitamura . | |
| 5,231,734 | 8/1993 | Rude . | |

Primary Examiner—P. Austin Bradley
Assistant Examiner—Chuck Y. Mah
Attorney, Agent, or Firm—Gottlieb, Rackman & Reisman

[57] ABSTRACT

There is disclosed a friction hinge assembly that can be inexpensively produced having a shaft and, in the simplest embodiment, one sheet metal part. In the preferred embodiment, the friction band and the bracket are one piece. In order to achieve the necessary alignment between the axis of the friction band and the axis of the shaft, the configuration of the mounting hole for the shaft is elongated only along one axis. This provides clearance for necessary manufacturing tolerances without introducing additional backlash. In another embodiment, proper alignment is assured by slotted mounting holes for mounting the friction bands to the bracket.

18 Claims, 4 Drawing Sheets

FRICTION HINGE

The wide use of visual electronic displays has created demand for friction hinges that are small and inexpensive to manufacture while having stable torque characteristics over a life of at least fifty thousand cycles of operation. The prior art contains examples such as U.S. Pat. No. 5,079,799, of hinges whose torque characteristics are predictable and stable, but these are too complex for low cost manufacturing. Other prior art hinges, such as U.S. Pat. Nos. 4,490,884 and 5,197,704, are somewhat less complex, but they are unacceptable because their torque characteristics vary unacceptably with use.

Devices for producing friction between rotating elements have been made for many years by placing one or more tightly fitted C shaped bands about a cylindrical shaft. The technology is an adjunct of the technology used to make band brakes and wrap spring clutches. Those experienced in the art of band brakes and wrap spring clutches will be aware that the bands can be used bi-directionally to obtain the maximum torque from each band for both rotational directions. However, this method of operation necessitates a certain amount of backlash in the operation of the hinge which is unacceptable for many applications.

To obtain the minimum possible lost motion between the forward and reverse direction of operation, it is necessary to restrain one end of each band. So constrained, the band will produce the highest torque for the rotational direction in which the band tends to tighten about the shaft, and roughly one half to three quarters of that torque for rotation in the opposite direction. The ratio will depend upon the coefficient of friction between the band and the shaft and the angle of wrap about the shaft. A friction hinge that exhibits the same torque in each direction can be made by using multiple bands each of which is attached at one of its ends. Half of the bands are wrapped in one direction about the shaft, and the other half are wrapped in the opposite direction about the shaft. Asymmetric torque can be achieved by using different numbers of identical bands in each direction. It can be achieved by varying other parameters as well, but using different numbers of identical bands provides a means of obtaining a range of torque values without having to produce bands with different characteristics.

Smaller electronic devices now require smaller hinges, and the technology described above, while still usable where space permits, is no longer practical in many newly designed systems because sufficient space is not available for bands and housings to contain them and to anchor the ends of the bands. Furthermore, intense price competition in the computer electronics field dictates that hinge prices must decrease and be as low as possible. Generally, in a manufactured product, cost can be reduced by achieving the desired function with fewer parts. Our invention provides a friction hinge with only two parts while still providing the advantages of friction hinges made according to the prior art.

BRIEF DESCRIPTION OF THE INVENTIVE FRICTION HINGE

The preferred embodiment of the friction hinge of our invention consists of a shaft and a single, formed sheet metal part having a band portion to grip the shaft and provide the frictional torque, together with side flanges, formed perpendicular to the shaft axis, with holes to serve as shaft bearings. An innovative feature of the invention is that the bearing holes in the sheet metal part are elongated to permit slight misalignment in only one direction. Even with careful control of tolerances, sheet metal cannot be formed with sufficient accuracy to provide perfect alignment between the band axis and the bearing holes. Enlarging the bearing holes to allow for misalignment is not desirable because any looseness of the shaft within its bearings becomes lost motion in the completed hinge. The hinge of our invention can be assembled and function properly with slight misalignment between the bearing holes and the band axis, while not exhibiting excessive lost motion because one direction of misalignment can be compensated for by slight bending of the band tab, and slight misalignment in the perpendicular direction is allowed by elongation of the bearing holes. In another embodiment of our invention, the band and the bracket are separate parts, with adjustment provided in the attachment therebetween to allow for slight variations of part dimensions in manufacturing.

Accordingly, it is an object of our invention to provide a friction hinge that is rigid and will not distort during movement.

It is another object of our invention to provide a friction hinge that is free of lost motion.

It is a further object of our invention to provide a friction hinge comprised of a minimum of component parts whose torque can be controlled during manufacture, and will not degrade significantly during its operating life.

It is yet another object of our invention to provide a friction hinge comprised of a minimum of component parts which can be inexpensively manufactured without sacrificing superior operating characteristics.

Other objects and advantages of our invention will become apparent from the descriptions that follow.

BRIEF DESCRIPTION OF THE DRAWINGS

Further understanding of our invention will become apparent upon consideration of the following detailed description in conjunction with the drawings, in which.

DETAILED DESCRIPTION OF THE INVENTION

Figure 1:
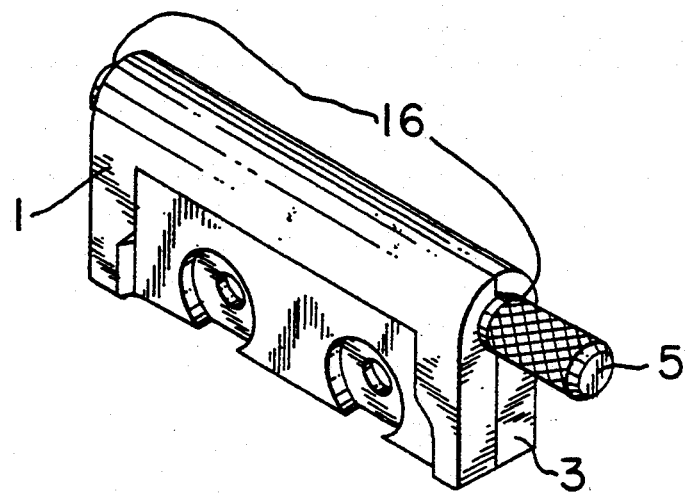
FIG. 1 is a perspective view of a friction hinge made according to prior art technology, namely, by clamping the tails of the bands with the hinge housing.
Figure 2:
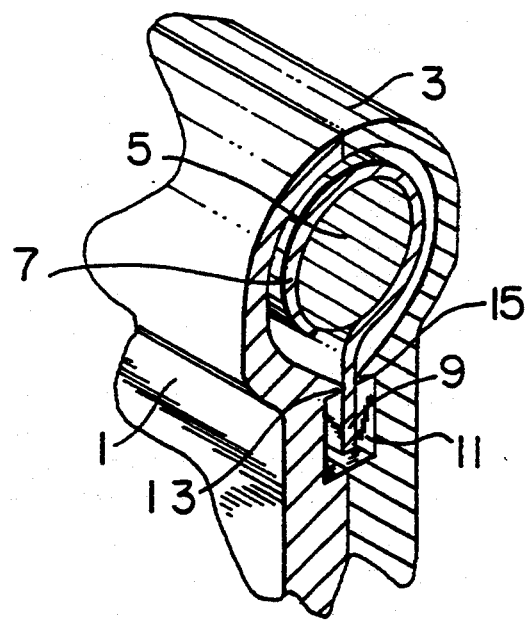
FIG. 2 is a partial cross-sectional view showing the friction hinge of FIG. 1 with the shaft and the end of the housing cut away to reveal one of the bands and its mounting.

In order to understand the benefit of the friction hinge of our invention it is instructive to examine a hinge of the prior art. The prior art friction hinge of FIGS. 1 and 2 is comprised of housing halves 1 and 3, shaft 5, and bands, only one of which, band 7, is visible in FIG. 2. The bands, which are made of a spring material, are sized to fit tightly about shaft 5 to provide the desired friction torque. There can be a number of such bands, oriented in either direction about shaft 5, in this friction hinge. At one end, each band has a straight section called a tail. The one that is visible in FIG. 2 is tail 9 of band 7. Slot 11 is formed into housings 1 and 2 for receiving the tails of all of the bands. Housing halves 1 and 2 have rails 13 and 15 respectively, formed as a part thereof, for gripping the tails of the bands. Housing halves 1 and 3 are made of a deformable material such as zinc, and the rails 13 and 15 are configured so that when the housing is assembled about the shaft and bands by pressing the two halves together, rails 13 and 15 deform somewhat, tightly gripping the tails of the bands.

It is of critical importance to the proper operation of this friction hinge that the shaft and the circular portion of the band be exactly coaxial. The position of the shaft in the assembled housing is ultimately determined by bearing holes 16, as seen in FIG. 1. Assembly fixturing, not shown, assures that the shaft is located properly as the housings are pressed around it. The bands are formed separately, before assembly, and there may be very slight differences from band to band in the detailed shape of the band and the tail. But these differences do not result in any axial misalignment because the crush rails 13 and 15 will grip the band tails wherever they come into contact with them as the housing halves are pressed together.

The friction hinge of FIGS. 1 and 2 performs well and has been used successfully in a number of products. It has excellent wear characteristics and considerable adaptability. By varying the thickness of the band material, it is possible to produce a wide range of friction torques to suit a number of different applications. However, there are some disadvantages. The hinge has rather a large number of piece parts and is somewhat slow to assemble, both of which tend toward extra expense. Having a housing surrounding the bands has the advantage that it is possible to lubricate the hinge while keeping the lubricant confined within the housing. It also keeps the frictional surfaces between the band and the shaft clean and dust free. But it makes the hinge both larger and heavier.

Figure 3:
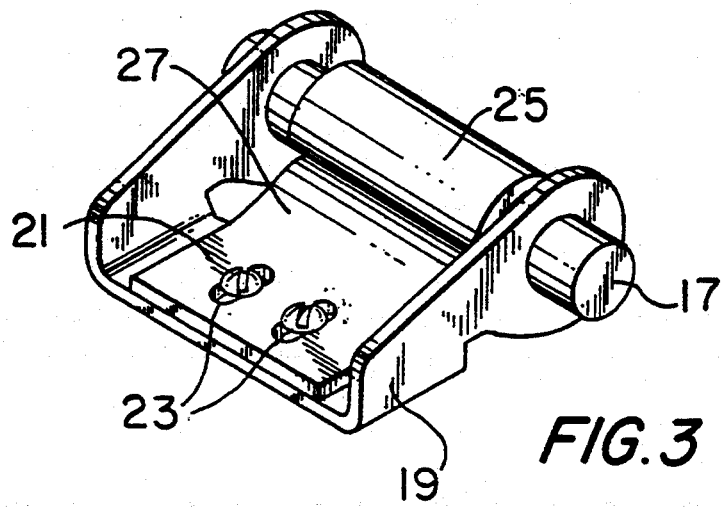
FIG. 3 is a perspective view of another friction hinge made according to the principles of our invention wherein the band is held by one of its ends using screws.

FIG. 3 shows a friction hinge of our invention. This friction hinge operates according to the same principles as does the one shown in FIG. 1. However, this friction hinge has no housing surrounding the band or bands. It has fewer parts and can be made smaller and lighter, and it can be manufactured less expensively.

Figure 4:
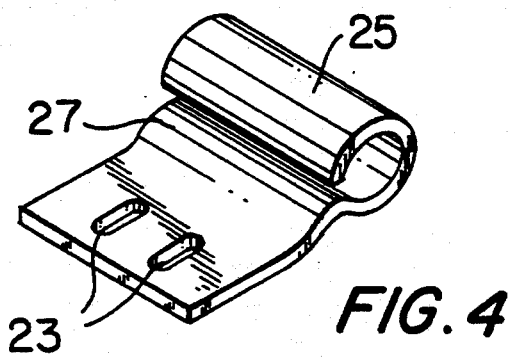
FIG. 4 is a perspective view of the band of the friction hinge of FIG. 3.
Figure 5:
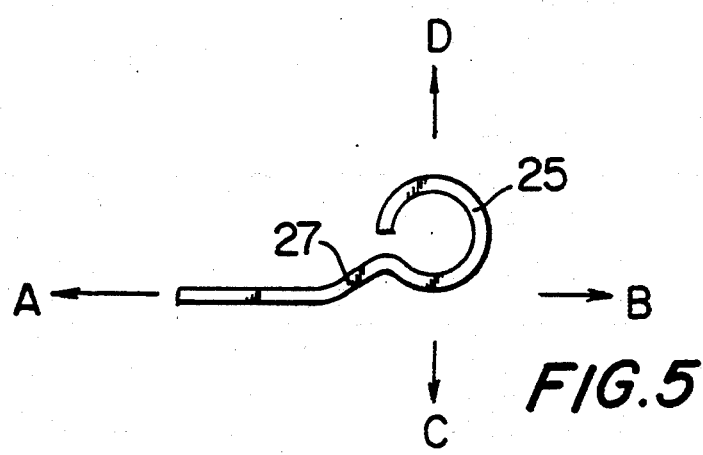
FIG. 5 is an end view in elevation of the band of FIG. 4 further including arrows A, B, C, and D to indicate directions of forces and deflections.

The friction hinge of FIG. 3 is composed of three parts, shaft 17, bracket 19, and band 21 which is also shown separately in FIGS. 4 and 5. Band 21 has circular portion 25, tail 27, and slotted mounting holes 23. Coaxial alignment between band circular portion 25 and shaft 17 is assured because movement is possible in all four directions, A, B, C, and D, as seen in FIG. 5. This is because slots 23 permit adjustment in directions A and B. This is also because tail 27 may be bent, providing any needed slight movement in directions C and D to assure perfect alignment.

Tail 27 of band 21 has very little stiffness to resist bending perpendicular to the plane of the material. The small amount of bending in the C-D direction that, during assembly, may be needed to properly align the band axis with the shaft, requires very little force, and so does not interfere with the proper operation of the friction hinge once it is assembled. Due to its geometry, band 21 has a great deal of stiffness in the A or B direction and is, therefore, very much more difficult to bend in those directions. Slots 23 are necessary for this friction hinge configuration, since without the adjustment capability provided by slots 23, adjustment in directions A or B could only be achieved by changing the shape of circular portion 25 which would change the frictional characteristics of the completed friction hinge. Naturally, the design could be altered to make the slots a part of the bracket rather than the band. Also, this configuration permits the use of several bands mounted to a single bracket. Therefore, with this arrangement, it is possible to make friction hinge having one band wrapped in each direction about the shaft to provide equal torque in each direction.

The preferred embodiment of the friction hinge of our invention is now shown in FIGS. 6-9. The friction hinge is comprised of two parts, shaft 29 and band-bracket 31. Shaft 29 can be identical the to shaft 17 of the friction hinge of FIG. 3. Band-bracket 31, seen in FIGS. 7-9, performs the function of both the band and the bracket in the design of FIG. 3. Band-bracket 31 has a central portion 33, visible in FIGS. 6, 7, and 9, having the same general configuration as band 21 in FIG. 3. Similarly, bracket portion 35 has the same general configuration as bracket 19 in FIG. 3. The difference is that in this case band portion 33 and bracket portion 35 are made of one piece of sheet metal.

Figure 6:
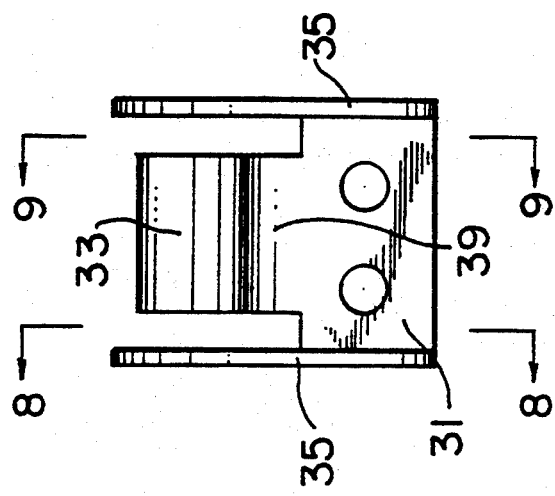
FIG. 6 is a perspective view of the preferred embodiment of the friction hinge of our invention.
Figure 8:
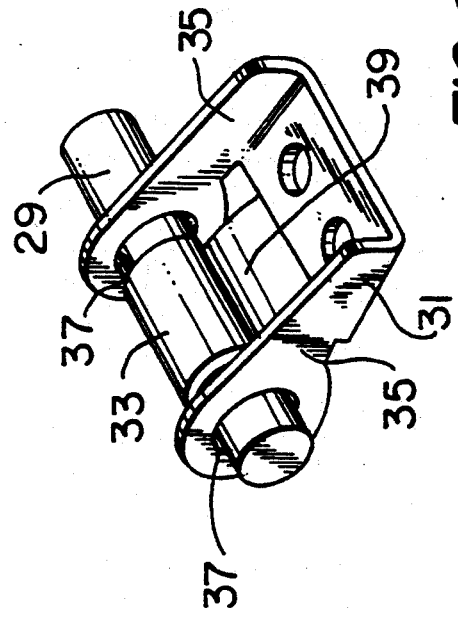
FIG. 8 is a cross-sectional view of the bracket portion of the hinge of FIG. 6
Figure 7:
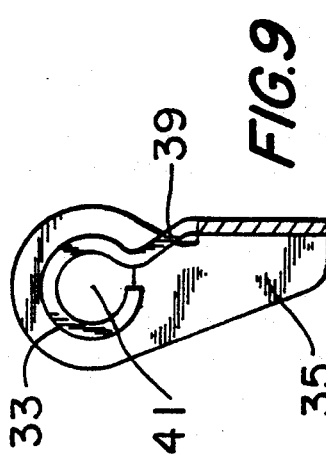
FIG. 7 is a top plan view of the friction hinge of FIG. 6
Figure 9:
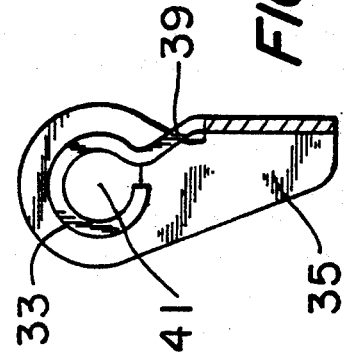
FIG. 9 is a cross-sectional view of the band portion of the hinge of FIG. 6

The advantages of this design include fewer parts, lower cost and complexity, and easier assembly. The disadvantages are that the three functions, mounting, bearing support for the shaft, and friction band, must all be performed by the same piece of material. With the earlier designs, it was possible to make separate choices of materials that were best suited for friction bands, and for bearings and mountings. Beyond that, assuming that a suitable material can be found, there is still a significant difficulty to be overcome before a friction hinge of this design can be manufactured practically. Tolerance buildup in the band-bracket would make it impractical to achieve the necessary alignment between the axes of the shaft and the band or bands. Sheet metal parts of this nature are normally produced by stamping all holes and the outside contour of the part in the flat, before any bends are made. Then the bends and rolling of the circular portion of the band are done. It would be very difficult, if not impossible, to assure accurate alignment as described above. However, our invention provides a simple means of producing a band-bracket which achieves the necessary alignment without any secondary operations and at minimal cost. Referring now to FIGS. 6-8, band bracket 31 holes 37. In the friction hinge of our invention, these bearing holes are elongated in the direction of tail portion 39, as best seen in FIG. 8. This elongation permits slight movement of shaft 29 in the direction A or B, as needed to achieve alignment of shaft and band. As before, any necessary slight movement in directions C or D, can be made by slightly deflecting tail portion 39 of the band during assembly of shaft 29 into band-bracket 31.

The opening of bearing hole 37 would have the normal amount of clearance appropriate for rotatable shaft in its bearing, perhaps a few thousandths of an inch. This clearance should be held to a minimum. This is because any movement of the shaft in its bearings becomes lost motion in the operation of the friction hinge. In the A-B direction, the extra clearance of the elongated bearing holes produces no increase in lost motion since the shaft is constrained to a certain position determined by the location of the axis of the circular portion 41 of band-bracket 31. If bearing holes 37 were not elongated, then the position of the axis of shaft 29 would be overdetermined, being forced to be coaxial with both axis 29 and the axis of bearing holes 37. If these two axes were not accurately aligned, then it would not be possible to assemble shaft 29 into band-bracket 31 wothout distorting the circular shape of band portion 33 which would interfere with proper friction hinge operation.

The band portion of any of the hinges so far described can be wound in either direction about its shaft. The choice of direction determines the direction in which the higher torque will be realized. In some cases, it may be desired to use the friction hinge of our invention to produce the same torque in both directions. Most frequently, two hinges are required anyhow, and by using one hinge wrapped in each direction, the torque in the two directions of rotation will be balanced.

Figure 10:
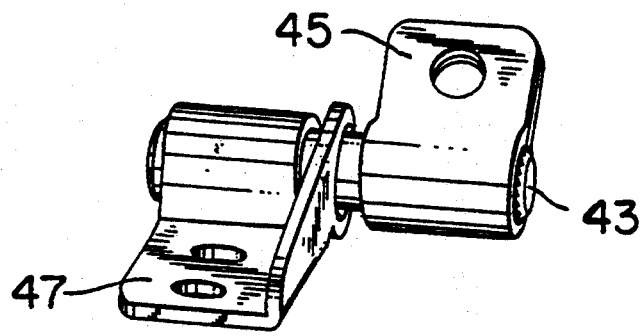
FIG. 10 is a perspective view of another embodiment of our invention.
Figure 11:
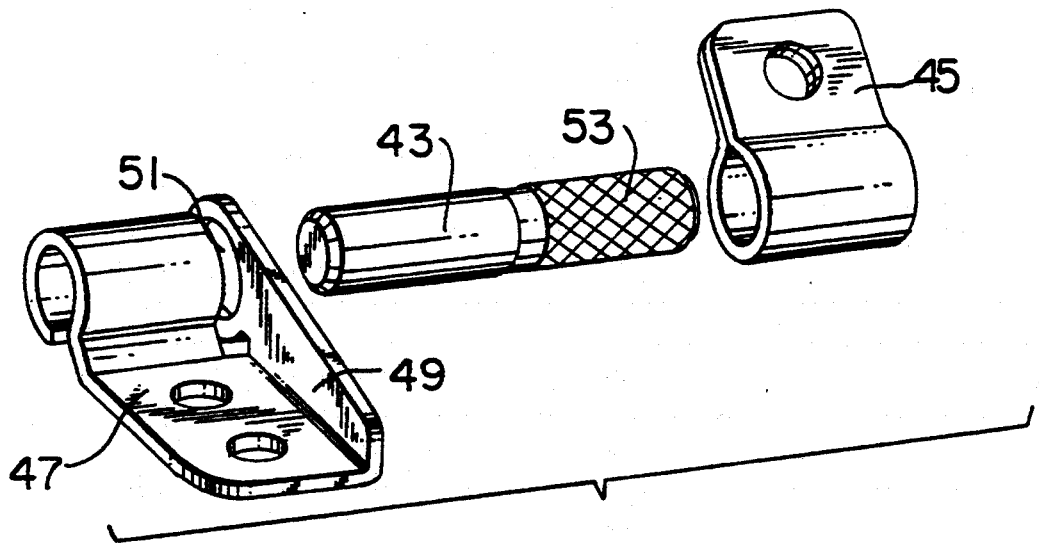
FIG. 11 is an exploded isometric view of the hinge of FIG. 10

Another embodiment of our invention is depicted, fully assembled, in FIG. 10, and in an exploded view in FIG. 11. Shaft 43 is similar to the shafts in other embodiment except that, in this case, it is shown with knurled end 53 for easy attachment to output adapter 45, which can be formed in any way convenient for attachment to shaft 43. This is still considered a two part hinge in that the attachment could have been formed as a part of shaft 43 without the addition of an extra part. The use of a separate part for the output adapter merely permits greater flexibility in manufacturing because standard shafts can be stocked and fitted with output adapters to suit various different applications. Band-bracket 47 is similar to band-bracket 31 of FIGS. 6–9, except that here there is only one bracket flange 49, resulting in a smaller hinge. Bracket flange 49 has the inventive elongated bearing hole 51 for supporting shaft 43 along the axis perpendicular to the elongated dimension of bearing hole 51. This configuration can be used only where there is, external to the hinge, adequate support to prevent rotation of the hinge axis. While the configuration of this friction hinge provides less support for the shaft than the earlier ones, adequate support is usually achieved if two hinges are used so that the structure attached to both hinges provides the needed stability.

The inventive mounting hole can also be beneficially applied to a hinge with a separate band and bracket such as the hinge of FIG. 3. In that case, slotted holes 23 would be replaced by round mounting holes for the band which provides a firmer mounting for the band, and the bearing holes in the bracket would be elongated to permit axial alignment as in the preferred embodiment.

It will thus be seen that the objects set forth above among those made apparent from the preceding description, are efficiently attained and, since certain changes may be made in the construction of the inventive spring clutch without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. A friction hinge assembly comprising:
   a shaft having an axis;
   a bracket for retaining said shaft comprising a base and at least one side wall extending in a direction perpendicular to said base and through which said shaft is mounted;
   a band having a first end wound about said shaft and a second end comprising a tail extending in a plane away from said shaft;
   means for selectively adjusting the relative translational position of said band wound end about said shaft in a direction substantially perpendicular to the axis of the shaft and substantially parallel to said plane in order to enable coaxial alignment of said band wound end and said shaft.

2. The assembly of claim 1, wherein said adjusting means comprises an opening formed in said at least one bracket side wall through which said shaft is mounted.

3. The assembly of claim 2, wherein said opening comprises a bearing hole elongated in configuration in said first and second directions.

4. The assembly of claim 3, wherein said band is substantially flexible.

5. The assembly of claim 3, wherein said band is integrally formed with said bracket.

6. The assembly of claim 5, wherein said tail leads into said base of said bracket.

7. The assembly of claim 5, wherein said integrally formed band and bracket are made of metal.

8. The assembly of claim 1, wherein said band is integrally formed with said bracket.

9. The assembly of claim 1, wherein said adjustment means comprises at least one opening formed in said tail of said band for mounting said band to said base of said bracket.

10. The assembly of claim 9, wherein said at least one opening comprises a mounting hole elongated in configuration in said first and second directions.

11. The assembly of claim 10, wherein said at least one hole receives a mounting screw for attaching said band to said base of said bracket.

12. The assembly of claim 11, wherein said mounting screw is selectively adjustable in tightness to enable said band to slide with respect to said shaft in said first and second directions.

13. A friction hinge assembly comprising:
   a shaft;
   a bracket for retaining said shaft comprising a base and at least one side wall extending in a direction perpendicular to said base and having a bearing hole through which said shaft is mounted; and
   a band having a first end wound about said shaft and a second end comprising a tail extending away from said shaft;
   wherein said bearing hole of said at least one bracket side wall through which said shaft is mounted is elongated in configuration in a direction in which said tail extends away from said shaft to enable coaxial alignment of said band wound end and said shaft.

14. The assembly of claim 13, wherein said band is integrally formed with said bracket.

15. The assembly of claim 13, wherein said tail leads into said base of said bracket.

16. The assembly of claim 13, wherein said at least one side wall comprises a pair of side walls of which each is formed with an elongated bearing hole.

17. The assembly of claim 13, wherein said shaft includes a portion which extends through said bearing hole of said at least one side wall and is attached to an output adapter.

18. The assembly of claim 17, wherein said shaft portion comprises a knurled end.

* * * * *